United States Patent [19]

Tsuchiya et al.

[11] Patent Number: 4,646,186

[45] Date of Patent: Feb. 24, 1987

[54] CASSETTE TAPE RECORDER WITH PLURAL TAPE GUIDE STRUCTURE

[75] Inventors: Tatsuhiko Tsuchiya; Norimasa Komatsu, both of Kakuda, Japan

[73] Assignee: Alps Electric Co., Ltd., Japan

[21] Appl. No.: 544,611

[22] Filed: Oct. 24, 1983

[30] Foreign Application Priority Data

Oct. 22, 1982 [JP] Japan ............................ 57-159051[U]
Oct. 22, 1982 [JP] Japan ............................ 57-159052[U]

[51] Int. Cl.$^4$ ............................................. G11B 15/60
[52] U.S. Cl. ............................. 360/130.21; 360/130.2; 360/96.1; 360/105
[58] Field of Search ............... 360/130.2, 130.21, 96.1, 360/96.2, 96.4, 128, 118, 90, 93, 105; 242/197, 198, 199, 200; 226/196, 200

[56] References Cited

U.S. PATENT DOCUMENTS

| 3,684,841 | 8/1972 | Boehme | 360/118 X |
| 4,096,533 | 6/1978 | Jenkins | 360/93 X |
| 4,314,294 | 2/1982 | Riccio et al. | 360/96.6 |
| 4,317,145 | 2/1982 | Osanai | 360/96.6 |
| 4,441,132 | 4/1984 | Morita et al. | 360/118 X |

FOREIGN PATENT DOCUMENTS

| 0433950 | 2/1968 | Japan | 242/199 |
| 0002709 | 1/1979 | Japan | 360/130.21 |
| 0139351 | 8/1983 | Japan | 360/109 |
| 2090459 | 7/1982 | United Kingdom | 360/96.6 |

Primary Examiner—Robert S. Tupper
Assistant Examiner—Andrew L. Sniezek
Attorney, Agent, or Firm—Guy W. Shoup

[57] ABSTRACT

A cassette tape recorder includes a combined head composed of a recording/playback head and an erase head, a first tape guide member positioned adjacent to the combined head and movable therewith for limiting transverse movement of a magnetic tape in a tape cassette while the magnetic tape is running, a second tape guide member positioned in spaced relation to the combined head so as to confront a substantially central portion of the tape cassette for limiting transverse movement of the magnetic tape while it is running, and a third tape guide member positioned in substantially symmetric relation to the first tape guide member with respect to the second tape guide member for limiting transverse movement of the magnetic tape while it is running, the arrangement being that the first, second and third tape guide members jointly guide the magnetic tape when the latter is fed along in recording and playback modes, and the first and third tape guide members jointly guide the magnetic tape when the latter is fed along at a higher speed. In another embodiment, a recording/playback head and an erase head are provided separately from each other, and the first and second tape guide members are positioned respectively adjacent to the recording/playback and erase head. The magnetic tape is guided by the first, second and third tape guide members at all times in various modes.

6 Claims, 10 Drawing Figures

CASSETTE TAPE RECORDER WITH PLURAL TAPE GUIDE STRUCTURE

BACKGROUND OF THE INVENTION

The present invention relates to a cassette tape recorder, and more particularly to a cassette tape recorder which uses a small-sized tape cassette known as a "microcassette".

There are known cassette tape recorders using small-sized tape cassettes such as microcassettes. Such cassette tape recorders however are less advantageous than those cassette tape recorders employing normal compact tape cassettes in that when the magnetic tape runs at a high speed such as in a CUE/REV mode, the magnetic tape travels unstably, and cannot be wound neatly, with tape edges damaged. Thin magnetic tapes sometimes cannot be wound on a takeup reel.

SUMMARY OF THE INVENTION

It is an object of the present invention to provide a cassette tape recorder which will eliminate the above prior shortcomings, and is capable of feeding a magnetic tape stably and winding the same neatly when it is fed at high speeds.

According to the present invention, there is provided a cassette tape recorder includes a combined head composed of a recording/playback head and an erase head, a first tape guide member positioned adjacent to the combined head and movable therewith for limiting transverse movement of a magnetic tape in a tape cassette while the magnetic tape is running, a second tape guide member positioned in spaced relation to the combined head so as to confront a substantially central portion of the tape cassette for limiting transverse movement of the magnetic tape while it is running, and a third tape guide member positioned in substantially symmetric relation to the first tape guide member with respect to the second tape guide member for limiting transverse movement of the magnetic tape while it is running, the arrangement being that the first, second and third tape guide members jointly guide the magnetic tape when the latter is fed along in recording and playback modes, and the first and third tape guide members jointly guide the magnetic tape when the latter is fed along at a higher speed. In another embodiment, a recording/playback head and an erase head are provided separately from each other, and the first and second tape guide members are positioned respectively adjacent to the recording/playback and erase head. The magnetic tape is guided by the first, second and third tape guide members at all times in various modes.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
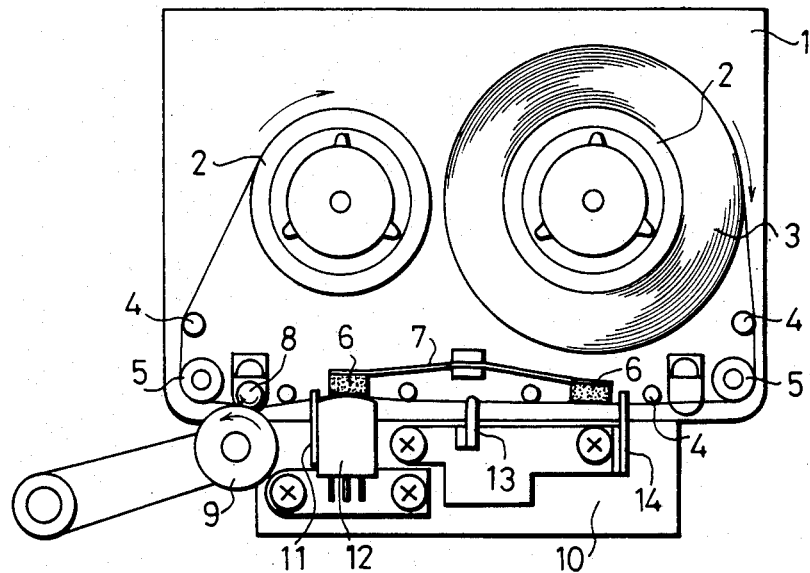
FIG. 1 is a plan view of a cassette tape recorder of the present invention with parts positioned in a PLAY mode.
Figure 2:
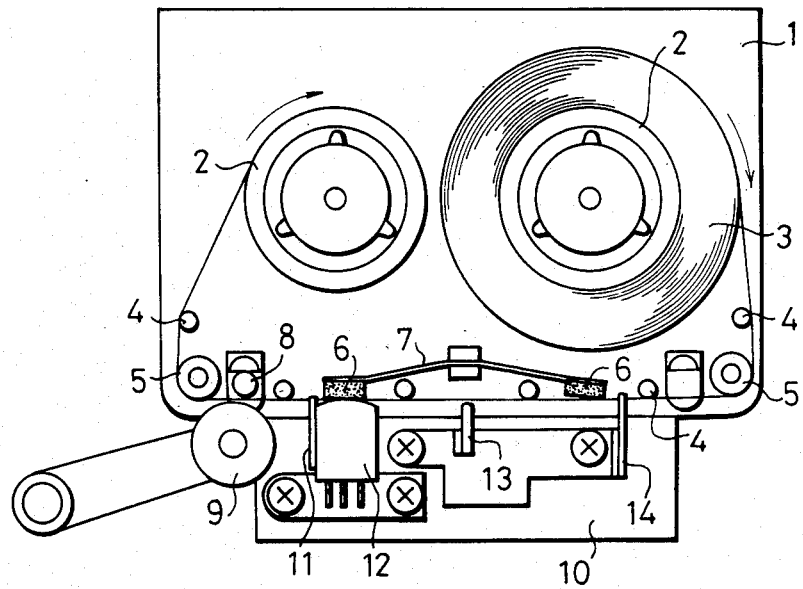
FIG. 2 is a plan view of the cassette tape recorder of FIG. 1 in a CUR/REV mode.

As shown in FIGS. 1 and 2, a microcassette 1 has a pair of hubs 2, 2 rotatably mounted therein and spaced from each other for winding a magnetic tape 3 therearound. The magnetic tape 3 as it is reeled off one of the hubs 2 is guided by a plurality of guide pins 4 and a guide roller 5 toward a front face of the microcassette 1, and then wound onto the other hub 2. Although not shown, the front face of the microcassette 1 has a central head insertion slot, and a pair of laterally symmetrical head insertion slots. A pair of pads 6, 6 is disposed in the microcassette 1 in confronting relation to the lateral head insertion slots, respectively, the pads 6, 6 being resiliently supported on a leaf spring 7.

When in a PLAY mode as shown in FIG. 1, the magnetic tape 3 is resiliently gripped between a capstan roller 8 and a pinch roller 9 in a cassette tape recorder, and travels in a desired direction in response to rotation of the rollers 8, 9. The cassette tape recorder includes a head base 10 positioned in face-to-face relation to the front face of the microcassette 1 and movable a prescribed distance toward and away from the microcassette 1. The head base 10 has a combined head 12 having a recording/playback head and an erase head and a first tape guide plate 11 attached to one side thereof, a second tape guide plate 13, and a third tape guide plate 14. When the microcassette 1 is placed in the cassette tape recorder, the first tape guide plate 11 and the combined head 12 are inserted into the lefthand lateral head insertion slot as viewed toward the front face of the microcassette 1, the second tape guide plate 13 is inserted into the central head insertion slot, and the third tape guide plate 14 is inserted into the righthand lateral head insertion slot. Therefore, the second tape guide plate 13 is positioned substantially in confronting relation to the center of the microcassette 1, while the first and third tape guide plates 11, 14 are located in symmetric positions, respectively, with respect to the second tape guide plate 13. In a REC/PLAY mode, the magnetic tape 3 travels sucessively past the third tape guide plate 14, the second tape guide plate 13, the combined head 12, and the first tape guide plate 11.

Figure 3:
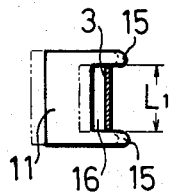
FIG. 3 is a side elevational view of a first tape guide in the cassette tape recorder shown in FIG. 1 with a magnetic tape guided thereby.
Figure 4:
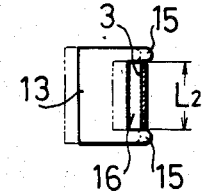
FIG. 4 is a side elevational view of a second tape guide in the cassette tape recorder with a magnetic tape guided thereby.
Figure 5:
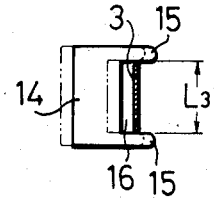
FIG. 5 is a side elevational view of a third tape guide in the cassette tape recorder with a magnetic tape guided thereby.

As shown in FIGS. 3, 4 and 5, each of the tape guide plates 11, 13, 14 has a pair of upper and lower guide projections 15, 15 disposed transversely one on each side of the magnetic tape 3 and having rectilinear inner surfaces. The upper and lower guide projections 15, 15 jointly define a recess 16 therebetween. Thus, each tape guide plate has a channel shape. The upper and lower guide projections 15, 15 of the first tape guide plate 11 are spaced from each other by a distance L1, the upper and lower guide projections 15, 15 of the second tape guide plate 13 are spaced from each other by a distance L2, and the upper and lower guide projections 15, 15 of the third tape guide plate 14 are spaced from each other by a distance L3. These distances are selected to meet the dimensional relationship: $L1 \leq L2 < L3$.

FIG. 1 shows the position in the PLAY mode in which the head base 10 is located closely to the microcassette 1. The combined head 12 enters a prescribed distance into the microcassette 1 through the lefthand head insertion slot with the magnetic tape 3 being resiliently sandwiched between the pad 6 and the combined head 12. The magnetic tape 3 is also resiliently gripped between the capstan roller 8 and the pinch roller 9 while running at a constant speed on rotation of the capstan roller 8 and the pinch roller 9.

In FIGS. 3, 4 and 5, the tape guide plates 11, 13, 14 are in the solid-line positions when in the PLAY mode. The tape guide plates 11, 13, 14 are pushed into the microcassette 1 with the magnetic tape 3 inserted substantially centrally of the guide projections 15 of the first and third tape guide plates 11, 14. The magnetic tape 3 is located in confronting relation to the distal ends of the guide projections 15 of the second guide plate 13. During the PLAY mode, the magnetic tape 3 is guided successively by the third tape guide plate 14, the second tape guide plate 13, and the first tape guide plate 11 in the order named. Therefore, the magnetic tape 3 is prevented from moving vertically by the three points, that is, the first, second, and third tape guide plates 11, 13, 14. The distance L3 between the guide projections 15, 15 of the third tape guide plate 14 is slightly larger than the distances L1, L2 between the guide projections 15, 15 of the other tape guide plates 11, 13. With such dimensions, the magnetic tape 3 as it runs is first roughly guided vertically by the third tape guide plate 14, and then guided vertically by the second and first tape guide plates 13, 11 with successively greater positional accuracies. This enables the magnetic tape 3 to be positioned correctly with respect to the combined head 12 positioned adjacent to the first tape guide plate 11. Since the dimension L3 of the third tape guide plate 14 is slighly greater than the dimensions L1, L2, the third tape guide plate 14 can be attached with less positional accuracy than the other tape guide plates 11, 13.

FIG. 2 shows the parts positioned in a CUE/REV mode. In this mode, the pinch roller 9 is spaced from the capstan roller 8 and the magnetic tape 3 is wound at a high speed onto one of the hubs 2 which is driven to rotate. At this time, the head base 10 is retracted a prescribed distance with the combined head 12 remaining in slight contact with the magnetic tape 3.

In FIGS. 3, 4 and 5, the tape guide plates 11, 13, 14 are located in the dotted-line positions when in the CUR/REV mode. The tape guide plates 11, 13, 14 are retracted with the head base 10 so that the second tape guide plate 13 disengages from the magnetic tape 3 as illustrated in IFGS. 2 and 4. While the first and third tape guide plates 11, 14 are retracted, the guide projections 15 thereof have their distal ends vertically confronting the magnetic tape 3. In the CUE/REV mode, therefore, the magnetic tape 3 is not limited by the second tape guide plate 13, but limited vertically by the first and third tape guide plates 11, 14.

FIGS. 6 through 10 show a cassette tape recorder according to another embodiment of the present invention.

Figure 6:
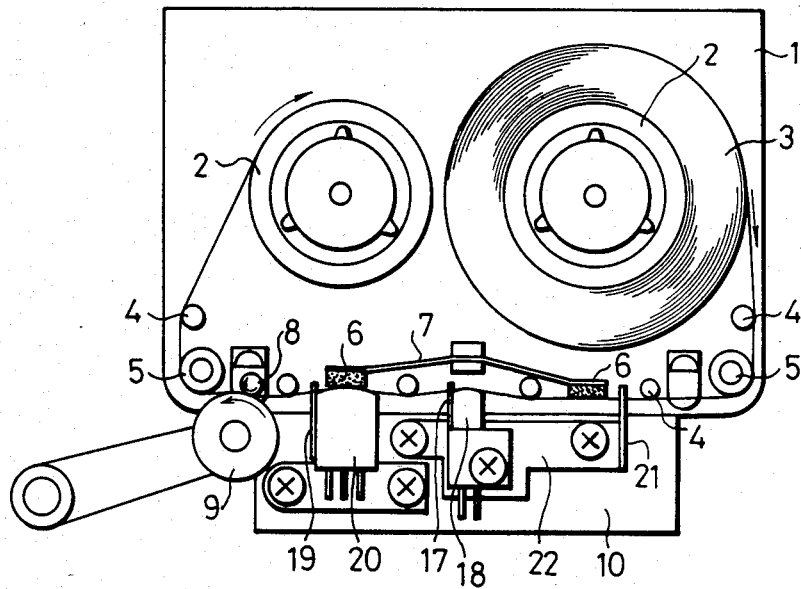
FIG. 6 is a plan view of a cassette tape recorder according to another embodiment of the present invention with parts in a PLAY mode.
Figure 7:
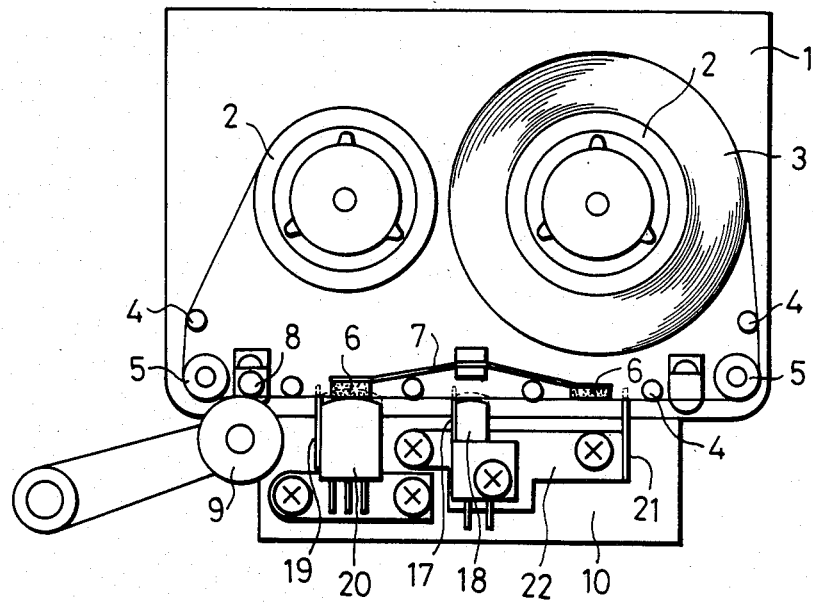
FIG. 7 is a plan view of the cassette tape recorder of FIG. 6 in a CUR/REV mode.

As illustrated in FIGS. 6 and 7, a microcassette 1 has a pair of hubs 2, 2 rotatably mounted therein and spaced from each other for winding a magnetic tape 3 therearound. The magnetic tape 3 as it is reeled off one of the hubs 2 is guided by a plurality of guide pins 4 and a guide roller 5 toward a front face of the microcassette 1, and then wound onto the other hub 2. Although not shown, the front face of the microcassette 1 has a central erase head insertion slot, and a pair of laterally symmetrical recording/playback head insertion slots. A pair of pads 6, 6 is disposed in the microcassette 1 in confronting relation to the lateral head insertion slots, respectively, the pads 6, 6 being resiliently supported on a leaf spring 7.

When in a PLAY mode as shown in FIG. 6, the magnetic tape 3 is resiliently gripped between a capstan roller 8 and a pinch roller 9 in a cassette tape recorder, and travels in a desired direction in response to rotation of the rollers 8, 9. The cassette tape recorder includes a head base 10 positioned in face-to-face relation to the front face of the microcassette 1 and movable a prescribed distance toward and away from the microcassette 1.

The head base 10 has an erase head 18 having a second tape guide plate 17 attached thereto, and a recording/playback head 20 with a first tape guide 19 attached thereto, and a third tape guide plate 21. The third tape guide plate 21 is constituted of a raised end of an attachment plate 22 of the erase head 18. This arrangement reduces a number of parts required and the cost of manufacture. When the microcassette 1 is placed in the cassette tape recorder, the second tape guide plate 17 and the erase head 18 are inserted into the erase head insertion slot as viewed toward the front face of the microcassette 1, the first tape guide plate 19 and the recording/playback head 20 are inserted into the lefthand recording/playback head insertion slot, and the third tape guide plate 21 is inserted into the righthand recording/playback head insertion slot. Therefore, the first and third tape guide plates 19, 21 are located in symmetric positions, respectively, with respect to the central second tape guide plate 17.

Figure 8:
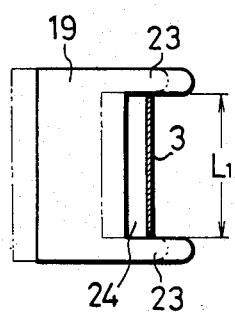
FIG. 8 is a side elevational view of a first tape guide in the cassette tape recorder shown in FIG. 6 with a magnetic tape guided thereby.
Figure 9:
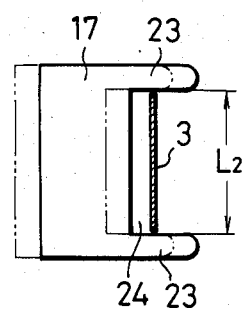
FIG. 9 is a side elevational view of a second tape guide in the cassette tape recorder with a magnetic tape guided thereby.
Figure 10:
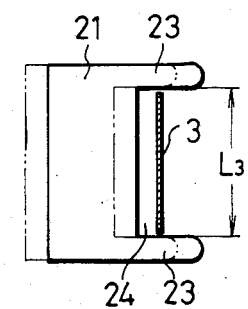
FIG. 10 is a side elevational view of a third tape guide in the cassette tape recorder with a magnetic tape guided thereby.

As shown in FIGS. 8, 9 and 10, each of the tape guide plates 19, 17, 21 has a pair of upper and lower rectilinear guide projections 23, 23 overlying and underlying the magnetic tape 3. The upper and lower guide projections 23, 23 jointly define a recess 24 therebetween. Thus, each tape guide plate has a channel shape. The upper and lower guide projections 23, 23 of the first tape guide plate 19 are spaced from each other by a tape guide width L1, the upper and lower guide projections 15, 15 of the second tape guide plate 17 are spaced from each other by a tape guide width L2, and the upper and lower guide projections 15, 15 of the third tape guide plate 21 are spaced from each other by a tape guide width L3. These tape guide widths are selected to meet the dimensional relationship: $L1 \leq L2 < L3$.

FIG. 6 shows the position in the PLAY mode in which the head base 10 is located closely to the microcassette 1. The recording/playback head 12 enters a prescribed distance into the microcassette 1 through the recording/playback head insertion slot with the magnetic tape 3 being resiliently sandwiched between the pad 6 and the recording/playback head 20. The magnetic tape 3 is also resiliently gripped between the capstan roller 8 and the pinch roller 9 while running at a constant speed on rotation of the capstan roller 8 and the pinch roller 9.

In FIGS. 8, 9 and 10, the tape guide plates 17, 19, 21 are in the solid-line positions when in the PLAY mode. The tape guide plates 17, 19, 21 are pushed into the microcassette 1 with the magnetic tape 3 inserted substantially centrally of the guide projections 23. The magnetic tape 3 as it is reeled off one of the hubs 2 by the coaction of the capstan roller 8 and the pinch roller 9 is guided successively by the third tape guide plate 21, the second tape guide plate 17, and the first tape guide plate 19 in the order named. Therefore, the magnetic tape 3 is prevented from moving vertically by the three points, that is, the first, second, and third tape guide plates 19, 17, 21. The tape guide width L3 between the guide projections 23, 23 of the third tape guide plate 21 is slightly larger than the tape guide widths L1, L2 between the guide projections 23, 23 of the other tape guide plates 17, 19. With such dimensions, the magnetic tape 3 as it runs is first roughtly guided vertically by the third tape guide plate 21, and then guided vertically by the second and first tape guide plates 17, 19 with successively greater positional accuracies. This enables the magnetic tape 3 to be positioned correctly with respect to the erase head 18 and the recording/playback head 20. By making the dimension L3 of the third tape guide plate 14 slighly greater than the tape width, the third tape guide plate 21 can be attached with less positional accuracy than the other tape guide plates 17, 19.

FIG. 7 shows the parts positioned in a CUE/REV mode. In this mode, the pinch roller 9 is spaced from the capstan roller 8 and the magnetic tape 3 is wound at a high speed onto one of the hubs 2 which is driven to rotate. Since in the CUE mode the lefthand hub 2 is driven to rotate, the magnetic tape 3 is reeled out of the righthand hub 2, moves successively past the third tape guide plate 21, the second guide plate 17, and the first tape guide plate 19, and then is wound around the lefthand hub 2. In the REV mode, the righthand hub 2 is driven to rotate to reel the magnetic tape 8 off the lefthand hub 2, feed the magnetic tape 3 past the first tape guide plate 19, the second tape guide plate 17, and the third tape guide plate 21, and wind the magnetic tape 3 around the righthand hub 2.

In FIGS. 8, 9 and 10, the tape guide plates 17, 19, 21 are located in the dotted-line positions when in the CUR/REV mode. The tape guide plates 17, 19, 21 are retracted with the head base 10 so that the distal ends of their guide projections 23 limit vertical movement of the magnetic tape 3. In the CUE mode, the magnetic tape 3 moves successively past the third tape guide plate 21, the second tape guide plate 17, and the first tape guide plate 19. As in the PLAY mode, the magnetic tape 3 is first roughly guided in its vertical movement by the third tape guide plate 21 having the greater tape guide width. Therefore, the magnetic tape 3 can be guided smoothly without being subjected to undue stresses.

In the REV mode, the magnetic tape 3 is reeled off the lefthand hub 2 and wound onto the righthand hub 2 at a high speed. Since the magnetic tape 3 is held in contact with the erase head 18 at this time, the magnetic tape 3 undergoes an irregular tension. Without the third tape guide plate 21 downstream of the erase head 18 in the direction of travel of the magnetic tape 3, the magnetic tape 3 would be curled or wobble up and down due to the tension it suffers from, with the result that the magnetic tape would be folded or fail to be wounded neatly due to steps on the coil of the wound tape. The tension the magnetic tape 3 undergoes while running would cause the tape 3 to be curled in the vicinity of the second tape guide plate 17 upstream of the erase head 18, allowing the second tape guide plate 17 to damage the magnetic tape 3.

In the foregoing embodiment, the recording/playback head and the erase head are disposed separately from each other. With such a cassette tape recorder, the erase head is insertable into a microcassette through a central head insertion slot defined in a front face of the microcassette, while the recording/playback head is insertable into the microcassette through a lefthand head insertion slot as viewed toward the front face of the microcassette. Since the recording/playback and erase heads have respective tape guide plates, the magnetic tape can more effectively be limited in its vertical movement than in cassette tape recorders having a combined head composed of a recording/playback head and an erase head with a tape guide plate attached. In the latter cassette tape recorder, the mere tape guide plate attached to the combined head is insufficient to limit the vertical movement of the magnetic tape. Therefore, another tape guide plate is necessary to suppress vertical movement of the magnetic tape.

In the PLAY mode, the magnetic tape is required to run while it is held in a proper position with respect to the combined head. Therefore, it is necessary to provide a tape guide plate in confronting relation to a head insertion slot in the center of the front face of a microcassette. Such a tape guide plate is relatively close to the combined head for coaction with the tape guide plate attached to the combined head in guiding the magnetic tape properly with respect to the combined head.

When the magnetic tape is fed along at a high speed as in the CUE/REV mode, the magnetic tape is kept in contact with the combined head and hence tends to suffer from irregular tension. This causes the magnetic tape to be twisted in the vicinity of the combined head upstream thereof. With the tape guide plate positioned in front of the center of the front face of the microcassette for guiding the magnetic tape while the latter is running at a high speed, the magnetic tape is liable to be curled and damaged by such tape guide plate.

With the first embodiment of the present invention, the magnetic tape is guided by the first, second and third tape guide plates spaced substantially equal intervals so as to be prevented from being displaced vertically. Therefore, the magnetic tape can be maintained in a proper position with respect to the combined head in the REC/PLAY mode. When the magnetic tape is fed at a high speed as in the CUE/REV mode, the second tape guide plate is retracted out of engagement with the magnetic tape and does not damage the magnetic tape. Any tendency of the magnetic tape to move vertically due to disengagement from the second tape guide plate can be prevented by the third tape guide plate. Since the third tape guide plate is relatively remote from the combined head, the magnetic tape is not twisted in the vicinity of the third tape guide plate and hence is protected from being damaged thereby. The magnetic tape while travelling at a high speed can therefore be guided effectively and stably without the danger of getting damaged, and can neatly be wounded on a takeup hub.

According to the second embodiment of the invention, the recording/playback and erase heads are separately disposed with the first and second tape guide plates are attached to the recording/playback and erase heads, respectively, and the third tape guide plate is positioned symmetrically relatively to the first tape guide plate with the second tape tuide plate located therebetween. The magnetic tape is guided by the first, second and third tape guide plates at all times in both the REC/PLAY mode and the CUE/REV mode.

Although certain preferred embodiments have been shown and described, it should be understood that many changes and modifications may be made therein without departing from the scope of the appended claims.

What is claimed is:

1. In a cassette tape recorder in which a cassette is inserted having a pair of reels and a magnetic tape wound from one reel onto the other reel, wherein the magnetic tape is wound to run in one running direction in recording and playback modes, and a portion of the running magnetic tape is arranged to run in the one running direction from an upstream side past an open portion in a front face of the cassette to a downstream side thereof, said open portion of the cassette being located adjacent a head base having a combined recording/playback and erase head thereon for recording and reproducing on and from the running magnetic tape, the improvement comprising:
(a) a first tape guide member adjacent said combined head on said head base, both being positioned facing opposite a downstream side of said front face of the cassette;
(b) a second tape guide member on said head base positioned facing opposite a central portion of the front face of the cassette;
(c) a third tape guide member on said head base positioned facing opposite an upstream side of said front face of the cassette;
(d) said first, second, and third tape guide members being spaced substantially equally apart from each other, whereby the magnetic tape can be stably guided at three symmetric points across the front face of the cassette, and each having an inner guide surface for guiding the running magnetic tape and a pair of upper and lower guide projections one on each side of the inner guide surface which are spaced apart a respective tape guide width accomodating at least the width of the magnetic tape for limiting transverse movement of the magnetic tape relative to the inner guide surface;
(e) said head base being movable a prescribed distance toward said front face of the cassette in the recording and playback modes such that said first, second, and third tape guide members and said combined head are in operative contact with the running magnetic tape; and
(f) said head base being movable a prescribed distance away from said front face of the cassette in a high speed mode where the magnetic tape is wound at a higher speed, and said tape guide members being positioned relative to each other such that in said high speed mode only said first and third tape guide members are in guiding contact with the magnetic tape.

2. In a cassette tape recorder in which a cassete is inserted having a pair of reels and a magnetic tape wound from one reel onto the other reel, wherein the magnetic tape is wound to run in one running direction in recording and playback modes, and a portion of the running magnetic tape is arranged to run in the one running direction from an upstream side past an open portion in a front face of the cassette to a downstream side thereof, said open portion of the cassette being located adjacent a head base having a recording/playback head and an erase head thereon for recording and reproducing on and from the running magnetic tape, the improvement comprising:
(a) a first tape guide member adjacent said recording/playback head on said head base, both being positioned facing opposite a downstream side of said front face of the cassette;
(b) a second tape guide member adjacent said erase head on said head base, both being positioned facing opposite a central portion of the front face of the cassette;
(c) a third tape guide member on said head base positioned facing opposite an upstream side of said front face of the cassette;
(d) said first, second, and third tape guide members being spaced substantially equally apart from each other, whereby the magnetic tape can be stably guided at three symmetric points across the front face of the cassette, and each having an inner guide surface for guiding the running magnetic tape and a pair of upper and lower guide projections one on each side of the inner guide surface which are spaced apart a respective tape guide width accomodating at least the width of the magnetic tape for limiting transverse movement of the magnetic tape relative to the inner guide surface, wherein said first, second, and third tape guide members have respective widths L1, L2, and L3 which are selected to meet the relationship $L1 \leq L2 < L3$, whereby a narrowing tape guide width sequence is provided from the upstream side to the downstream side of the running direction of the magnetic tape:
(e) said head base being movable a prescribed distance toward said front face of the cassette in the recording and playback modes such that said first, second, and third tape guide members and said heads are in operative contact with the running magnetic tape; and
(f) said head base being movable a prescribed distance away from said front face of the cassette in a high speed mode where the magnetic tape is wound at a higher speed, and said tape guide members being positioned relative to each other on said head base such that in said high speed mode said first, second, and third tape guide members are in guiding contact with the magnetic tape.

3. A cassette tape recorder according to claim 1, wherein said first, second and third tape guide members have tape guide widths L1, L2 and L3, respectively, which are selected to meet the relationship $L1 \leq L2 < L3$.

4. A cassette tape recorder according to claim 1 or 2, wherein said first, second and third tape guide members have guide projections having inner rectilinear edges located transversely one on each side of the inner guide surface.

5. A cassette tape recorder according to claim 1, wherein said first tape guide member is attached laterally to said combined head.

6. A cassette tape recorder according to claim 2, wherein said first tape guide member is attached laterally to said recording/playback head, and said second tape guide member is attached laterally to said erase head.

* * * * *